US000001895H

United States Statutory Invention Registration [19]

[11] Reg. Number: H1,895

Hoffpauir et al.

[45] Published: Oct. 3, 2000

[54] APPLICATION PROVIDER AND METHOD FOR COMMUNICATION

[75] Inventors: Scott D. Hoffpauir, Collierville; Steve B. Liao, Memphis, both of Tenn.

[73] Assignee: DSC/Celcore, Inc., Plano, Tex.

[21] Appl. No.: 09/026,230

[22] Filed: Feb. 19, 1998

Related U.S. Application Data

[60] Provisional application No. 60/060,107, Sep. 26, 1987.

[51] Int. Cl.[7] ..... H04Q 7/20

[52] U.S. Cl. ..... 455/433

[56] References Cited

U.S. PATENT DOCUMENTS

| | | | |
|---|---|---|---|
| 5,487,101 | 1/1996 | Fletcher | 379/60 |
| 5,521,961 | 5/1996 | Fletcher et al. | 379/59 |
| 5,623,532 | 4/1997 | Houde et al. | 379/58 |
| 5,627,881 | 5/1997 | Fletcher | 379/60 |

OTHER PUBLICATIONS

Steve Chen, "*Hybrid MicroSystems: The Ultimate Flexibility in Cellular Applications*", 1996, pp. 1–16, Celcore, Inc., Memphis, Tennessee.

"*GlobalHub Mobility Manager—Enables "One Number" PCS Service Via Motorola PPS Residential Products*" pp. 1–2, Celcore, Inc., Memphis, Tennessee, 1996.

"*IS–41 Network Hub—The Mobility Manager for Celcore's GlobalSystem*" pp. 1–2, Celcore, Inc., Memphis, Tennessee, 1996.

"*GlobalHub*" pp. 1–10, Celcore, Inc., Memphis, Tennessee, 1996.

John Scourias, "*Overview of the Global System for Mobile Communications*" Mar. 27, 1996, pp. 1–16, John Scourias.

Martin A. Iroff & Steve Chen, "A distributed GSM Architecture for Low–Traffic Density Markets", *Mobile Communications International*, Oct. 1996, pp. 1–3, IBC Business Publishing, London, England.

Information pamphlet, Feb. 1997, pp. 1–7, Version 1.0, Celcore, Inc., Memphis, Tennessee.

"*BS–20/BS–21, D900/D1800 Base Transceiver Station*", pp. 1–2, Geschaftszweig Mobilfunknetze, Munchen, Germany, 1997.

"*ICs for Communications–Memory Time Switch Large MTSL*" Mar. 1995, pp. 1–15, Version 2.1, Siemens AG, Munchen, Germany.

(List continued on next page.)

*Primary Examiner*—Daniel T. Pihulic

[57] ABSTRACT

In one aspect of the present invention, an application provider, such as a mobile application part provider (52), is provided that includes a table (210), a router (200) and a message converter (220). The table (210) stores information corresponding to a sub-system, such as a visitor location register (46) or a home location register (44), of a first node, such as an integrated wireless telecommunications switch (14). The router (200) analyzes an application part message, such as a mobile application part message, that originated from the first node and compares the information stored in the table to the destination of the application part message to determine if the application part message is destined for the sub-system of the first node. The router (200) communicates the application part message to the first node if the application part message is destined for the sub-system of the first node. The message converter (220) converts the application part message to a transaction capability application part message if the router (200) determines that the application part message is not destined for the sub-system of the first node.

34 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

OTHER PUBLICATIONS

"*ICs for Communication–Multipoint Switching and Conferencing Unit—Attenuation MUSAC–A*" Feb. 1996, pp. 1–68, Version 1.2, Siemens AG, Munchen, Germany.
"*ICs for Communications—Multichannel Network Interface for HDLC MUNICH32*" Jan. 1996, pp. 1–252, Version 3.2, Siemens AG, Munchen, Germany.
"*Unique Solutions to Complex Challenges of Wireless Carriers*" pp. 1–9, Celcore, Inc., Memphis, Tennessee, 1997.

Michel Mouly and Marie–Bernadette Pautet "*The GSM System for Mobile Communications*", 1992, pp. 79–122, pp. 261–646, Cell & Sys, France.

George Lamb "*GSM made Simple*", 1997, pp. 3–158, Regal Printing, United States of America.

Lawrence Harte, Steve Prokup, and Richard Levine "*Cellular and PCS, The Big Picture*", 1997, pp. 61–181, McGraw–Hill, United States of America.

APPLICATION PROVIDER AND METHOD FOR COMMUNICATION

CLAIM OF PRIORITY

This application claims priority from U.S. provisional patent application Ser. No. 60/060,107, entitled Cellular Communication System by Anthony G. Fletcher and Scott D. Hoffpauir as inventors, and filed on Sep. 26, 1997.

TECHNICAL FIELD OF THE INVENTION

This invention relates in general to the field of telecommunications and more particularly to an application provider and method for communication.

BACKGROUND OF THE INVENTION

Telecommunications networks and systems, including wireless networks and systems, use signaling provided over a signaling network to set up and tear down calls and to perform non call-setup or transaction functions such as the various services offered by an Advanced Intelligent Network (AIN) . Generally, signaling functions may be grouped into call-setup functions and non call-setup or transaction functions. The call-setup functions are concerned with setting up and then releasing or tearing down calls, while the non call-setup or transaction functions involve providing services that generally require a database query to determine how to proceed with a call. A few examples of the non call-setup or transaction functions include toll-free number routing, credit card validation and roaming in wireless telecommunications networks.

Today, digital signaling networks use a newer out-of-band signaling system and protocol developed by the International Telegraph and Telephone Consultative Committee (CCITT) and called Signaling System 7 (SS7). SS7 provides a layered functional structure and uses destination routing, octet oriented fields, variable length messages, and a highly reliable message transfer protocol. SS7 also provides flow control, connection and connection-less services, and Integrated Services Digital Network (ISDN) capabilities. Out-of-band signaling and SS7 solve many of the disadvantages associated with older in-band signaling techniques. A signaling network implementing SS7 may be referred to as an SS7 signaling network.

A typical SS7 signaling network will include a local digital switch, which may be referred to as a Service or Signal Switching Point (SSP), transmission facilities with associated transport devices including a first channel bank and a second channel bank, a Signal Transfer Point (STP), and a Service Control Point (SCP) . The STP may be implemented as a specialized packet switch optimized for SS7 packets. The SCP may be used to control an associated local digital switch, or a tandem switch in other embodiments, that supports AIN services (also referred to as AIN applications), and may be implemented as a computer and associated database that includes network and customer-specific information to perform such tasks as call routing and number (address) translation to deliver network services.

SS7 uses a Point Code (PC) to identify each node of a telecommunications network and a Sub-System Number (SSN) to identify particular elements or sub-systems of each node. A PC is unique for each node of a particular telecommunications network, but it is not unique across multiple networks. As a result, a PC and an SSN cannot be used to uniquely identify a particular node or a particular sub-system of a network for inter-network communications. Instead, SS7 uses a Global Title (GT) to uniquely identify each node and sub-element of every telecommunications network. A GT, unlike a PC, is unique for every node of every network; thus, a GT may be used for inter-network communications to uniquely identify every node and every sub-system of every telecommunications network. The GT may undergo one or more Global Title Translations (GTTs) before for example, a message is delivered to a destination node and sub-system. As a result of the one or more GTTs, the PC and SSN of a particular local element or sub-system is ultimately revealed.

The SS7 protocol includes a layered functional structure that is comprised of various layers or parts.

Generally, originating messages, including destination addresses, are provided from upper layers or parts to lower layer or parts. The various layers or parts concerned with the non call-setup or transaction functions are outlined below. Generally, the non call-setup or transaction functions include both transport functions and transaction functions.

The transport functions are divided into four parts that include a Message Transfer Part (MTP) that comprises three of the four parts and a Signaling Connection Control Part (SCCP) that comprises the fourth part. These four parts of the transport functions may be designated as the MTP 1, the MTP 2, the MTP 3 and the SCCP and are listed from lower to higher layers or parts. The three MTP parts provide functions for basic routing of signaling messages between signaling points. The MTP parts preferably use PCs provided in a MTP message to provide the basic routing of signaling messages between signaling points. The three MTP parts also provide the complete lower level functionality at the Physical, Data Link and Network Level. The SCCP part resides above the three MTP parts and provides additional routing and management functions to the MTP for the transfer of messages other than call setup between signaling points. The SCCP may include a routing table and supports higher level layers, detailed below, with an array of services including both connection-less and connection oriented services. The SCCP can perform GTTs to generate a PC and SSN that are used to convert an SCCP message to an MTP message by adding an MTP header to an SCCP message.

The transaction functions of the SS7 protocol include a Transaction Capabilities Application Part (TCAP) and an application or user part (hereinafter application part). The TCAP resides above the SCCP and provides for the exchange of non-circuit related, transaction-based information between signaling points and network entities that include signaling functions for communication with network databases. The TCAP includes building blocks that may be subdivided into the transaction sublayer and the component sublayer. The TCAP can generate an SCCP message by adding an SCCP header to a TCAP message. The Application Part may be defined as an application which resides above the TCAP and which may generate a TCAP message or primitive for use by the TCAP. For example, the following applications or services may be referred to as an application part: the Mobile Application Part (MAP), including at least an Interim Standard 41 (IS-41) and a Global System for Mobile Communications (GSM) standards that address registration of roamers and intersystem hand-off procedures, an Interim Standard 634 (IS-634), an Intelligent Network Application Part (INAP), an Intelligent Network Capability Set (INCS) application, an AIN application and any other application which uses the TCAP. The application parts may use an application provider and the like to generate a TCAP message from an application part message for use by the TCAP.

An example of the operation of an application provider of an application part may be illustrated by the operation of a MAP Provider of a GSM MAP. The MAP represents a set of procedures that provide the bridge between the various sub-systems of a GSM wireless telecommunications system to support subscriber unit mobility. Such sub-systems may include a Mobile Switching Center (MSC), a Visitor Location Register (VLR), and a Home Location Register (HLR). The MAP support includes management of subscriber location, transfer of subscriber data between network elements, call set-up and subscriber database fault recovery. The MAP Provider furnishes the interface for MAP dialogues between, for example, the MSC, VLR, and HLR.

For example, assume that a common node, such as a wireless telecommunications system, has a first sub-system, such as a VLR, and a second sub-system, such as an HLR, and the first sub-system desires to send a MAP message to the second sub-system. The MAP Provider receives the MAP message provided by the first sub-system and generates a TCAP message in response. The MAP Provider may attach a TCAP header to the MAP message to generate the TCAP message, such as by converting a MAP primitive to a TCAP primitive. TCAP then receives the TCAP message and converts it to an SCCP message by attaching or including an SCCP header. An SCCP then receives the SCCP message and performs a Global Title Translation (GTT) to determine the destination address of the message. When it is discovered that the message is destined for the second sub-system of the common node, the SCCP message is then sent back to the TCAP. The TCAP generates a TCAP message by removing the SCCP header. The MAP Provider in turn receives the TCAP message and generates the original MAP message by removing the TCAP header. The MAP message is then sent to the second sub-system of the common node.

Thus, whenever a MAP message is destined for a local sub-system or sub-element, significant processing capability is consumed only to determine that the MAP message should be provided back to a local sub-system. The MAP Provider example illustrates that five conversions are performed on the MAP message after it is received by the MAP Provider only to determine that the MAP message was destined for the second sub-system of the common node. These additional conversions consume considerable processing resources and harm overall performance of a telecommunications system and signaling network. Further, these additional conversions unnecessarily consume the limited resources of the MAP Provider and the TCAP. Specifically, these additional conversions unnecessarily consume resources used to process dialogues. As a consequence, the overall bandwidth of the wireless telecommunications system may be reduced, fewer subscribers may be supported and telecommunications services, such as AIN and roaming, may not be as timely provided.

Application providers, other than MAP Providers, also suffer from this significant disadvantage such that signaling communication between local sub-systems of a common node, which are frequently needed, require multiple transactions using various SS7 layers or parts as illustrated above in the MAP Provider example. This is inefficient and further increases congestion and loading of the SS7 signaling network.

SUMMARY OF THE INVENTION

From the foregoing it may be appreciated that a need has arisen for an application provider and method for communication between a first sub-system and a second sub-system of a common node. For example, the application provider may be a mobile application part provider, the first and second sub-systems may be a home location register and a visitor location register, and the common node may be a wireless telecommunications system. The present invention provides an efficient means for communication between the first and second sub-system of a common node that provides many technical advantages, some of which are outlined below. In accordance with the present invention, there is provided an application provider and method for communication that substantially eliminate and reduce the disadvantages and problems outlined above.

According to an aspect of the present invention, an application provider is provided that includes a table, a router and a message converter. The table stores information corresponding to sub-systems of a first node. The router analyzes an application part message that originated from a sub-system of the first node and compares the information stored in the table to the destination of the application part message to determine if the application part message is destined for a sub-system of the first node. The router communicates the application part message to the destination sub-system of the first node if the application part message is destined for a sub-system of the first node. The message converter converts the application part message to a transaction capability application part message if the router determines that the application part message is not destined for a sub-system of the first node. The application provider may also be provided as part of a call processing application.

According to another aspect of the present invention, a method for communication between a first sub-system and a second sub-system of a first node is provided that includes the steps of communicating an application part message from the first sub-system to an application provider, and determining if the application part message is destined for the second sub-system. The method further includes the steps of communicating the application part message to the second sub-system if the application part message is destined for the second sub-system. Finally, the method may include the steps of converting the application part message to a transaction capabilities application part message if the application part message is not destined for the first node, and communicating the transaction capabilities application part message to a second node.

The present invention provides a multitude of technical advantages. One technical advantage of the present invention includes the elimination of multiple, unnecessary signaling transactions. This reduces the overall processing requirements which results in a telecommunications system that is capable of serving more subscribers and of providing signaling services, such as AIN services and roaming services, in a more timely and efficient manner. This may also reduce overall system costs by eliminating the need to add additional processors or processing capability to achieve the same performance allowed by the present invention. Another technical advantage of the present invention includes the capability to integrate additional telecommunications systems or nodes into a telecommunications network with minimal congestion or loading of the SS7 signaling network. Yet another technical advantage of the present invention includes reduced application or service development costs because of the ability to use the application provider of the present invention to facilitate communication between sub-systems of a common node without having to interface with the details of the TCAP or other layers of SS7. Other technical advantages are readily apparent to one skilled in the art from the following figures, description, and claims.

BRIEF DESCRIPTION OF THE DRAWINGS

For a more complete understanding of the present invention and the advantages thereof, reference is now made to the following brief description, taken in connection with the accompanying drawings and detailed description of one embodiment of the present invention, wherein like reference numerals represent like parts, in which.

DETAILED DESCRIPTION OF THE INVENTION

Figure 1:
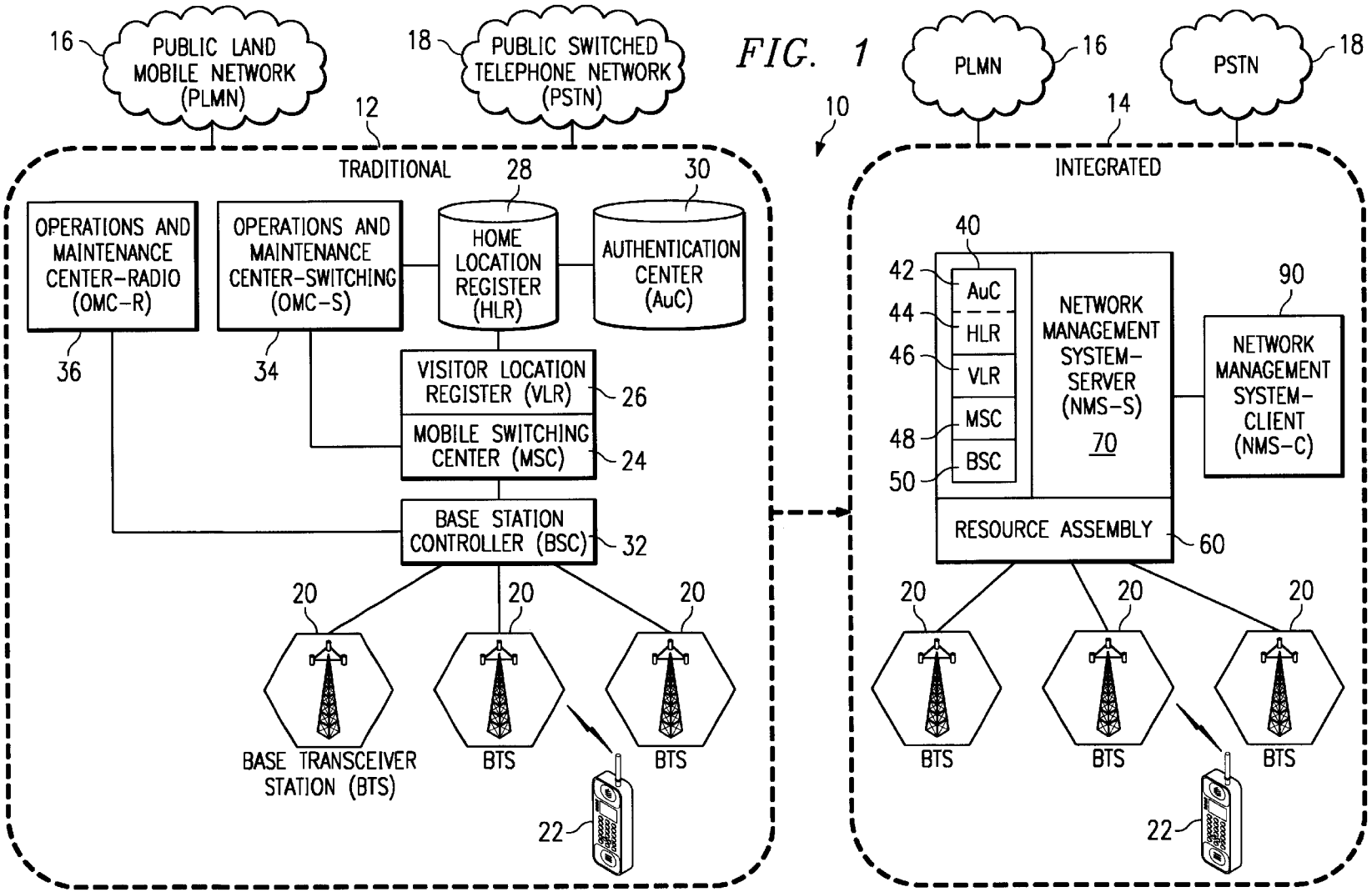
FIG. 1 is a block diagram illustrating the integration of a traditional wireless telecommunications system into an exemplary integrated wireless telecommunications system.

FIG. 1 is a block diagram 10 illustrating the integration of a traditional wireless telecommunications system 12 into an exemplary integrated wireless telecommunications system 14. The traditional wireless telecommunications system 12 and the integrated wireless telecommunications system 14 are illustrated as Global System for Mobile Communications (GSM) wireless telecommunications systems. However, it should be understood at the outset that the present invention, although illustrated herein using a GSM wireless telecommunications system, is in no way limited to GSM wireless telecommunications systems and may be implemented in a variety of wireless telecommunications systems using any of a variety of technologies and technical standards. For example, and without limitation, the present invention may be implemented in wireless telecommunications systems implementing the following technologies and technical standards: Code Division Multiple Access (CDMA); Time Division Multiple Access (TDMA); Frequency Division Multiple Access (FDMA); and Personal Communications Service (PCS).

The traditional wireless telecommunications system 12 and the integrated wireless telecommunications system 14 are shown coupled to a Public Land Mobile Network (PLMN) 16 and a Public Switched Telephone Network (PSTN) 18 for the exchange of information, including, for example, both voice and data. Of course, although PLMN 16 and PSTN 18 are public networks, the traditional wireless telecommunications system 12 and the integrated wireless telecommunications system 14 may also interface with private networks.

The traditional wireless telecommunications system 12 and the integrated wireless telecommunications system 14 preferably include one or more Base Transceiver Stations (BTSS) 20 for communication through a common air interface or radio interface to a subscriber unit 22. The information exchanged through the common air interface or radio interface is provided as a digital signal in digital wireless telecommunications systems and as an analog signal in analog wireless telecommunications systems. This exchange of information may be encrypted to enhance privacy and security.

Each of the BTSs 20 generally include an antenna for exchanging radio signals with the subscriber unit 22 and a transceiver for exchanging information between the antenna and the wireless telecommunications switch, which is described more fully below. The BTSs 20 are normally housed in cabinets together with the antennas. The cabinets often contain an air-conditioning unit, heating unit, electrical supply, telephone hook-up and a back-up battery supply.

The remaining subsystems of the traditional wireless telecommunications system 12 and the integrated wireless telecommunications system 14 may be referred to as a wireless telecommunications switch. Many of the components or sub-systems of the traditional wireless telecommunications system 12 have been integrated to provide the novel solution illustrated by the integrated wireless telecommunications system 14. This integration may be best understood by first describing the various sub-systems of the traditional wireless telecommunications system 12 and then the integrated wireless telecommunications system 14.

The traditional wireless telecommunications system 12 includes, in addition to one or more of the BTSs 20 and subscriber units 22, a wireless telecommunications switch that may generally be defined to include the remaining components shown in FIG. 1. For example, in a GSM wireless telecommunications system, these components may include a Base Station Controller (BSC) 32, a Mobile Switching Center (MSC) 24, a Visitor Location Register (VLR) 26, a Home Location Register (HLR) 28, an Authentication Center (AuC) 30, an Operations and Maintenance Center - Switching (OMC-S) 34, and an Operations and Maintenance Center - Radio (OMC-R) 36. With the exception of the MSC 24 and the VLR 26, each of these components or sub-systems of the wireless telecommunications switch is generally implemented as a separate piece of equipment, often from different manufacturers, that must be separately maintained and interfaced. As mentioned above, this is expensive, cumbersome and suffers from various disadvantages.

The BSC 32 is provided between the one or more BTSs 20 and the MSC 24 and provides control to the one or more BTSs 20. The BSC 32 is implemented as a stand-alone computer that manages the radio resources for the one or more BTSs 20 including radio-channel setup, frequency hopping and handovers. The BSC 32 tracks the various radio channels used by the one or more BTSs 20 and the subscribers that are using each radio channel. The BSC 32 allocates and releases the radio channels and regulates the transmit power level of the antennas of the one or more BTSs 20. As the subscriber unit 22 moves closer to an antenna, the BSC 32 lowers the transmitter power level, and as the subscriber unit 22 moves away from the antenna, the BSC 32 raises the transmitter power level.

In a GSM wireless telecommunications system, the BSC 32 can support and control multiple BTSs 20 through a proprietary link referred to as an Abis link. Information is generally exchanged between the one or more BTSs 20 and the BSC 32 at sixteen kbps. The LAPD protocol may be used for signaling. The proprietary Abis link normally requires the BSC 32 and the one or more BTSs 20 to be provided by the same manufacturer. This can substantially increase overall system costs. The BSC 32 may be implemented as a switch with significant computational capability. The BSC 32 may also include a Transcoder/Rate Adapter Unit (TRAU) that performs system dependent coding, such as GSM-specific speech encoding and decoding, and rate adaptation.

The BSC 32 also interfaces and exchanges information with the MSC 24 through a link defined in the GSM specifications and referred to as the "A" interface. Signaling information, normally using the Signaling System 7 (SS7) protocol, is exchanged between the BSC 32 and the MSC 24. Voice and data are also exchanged at sixty-four kbps. The BSC 32 may use the TRAU to convert the voice and data between sixteen kbps and sixty-four kbps.

The OMC-R 36 is a stand-alone sub-system that interfaces with the BSC 32. The OMC-R 36 manages and monitors the functions and operations of the BSC 32 and the one or more BTSs 20. The OMC-R 36 includes a user interface and is provided as a stand-alone workstation. Generally, the OMC-R 36 will be manufactured by the same company that manufactures the BSC 32 and the BTSs 20 that it manages and monitors. The OMC-S 34 is a separate stand-alone workstation that will be described more fully below.

The MSC 24 functions as a switch to connect calls from sender to receiver, to collect the details of calls made, and to supervise the operation of the remainder of the switch. As mentioned above, the MSC 24 is in contact with its mobile subscribers through the BSC 32. The MSC 24 interfaces with the BSC 32 through the A interface so that information, including signaling information, may be exchanged. The MSC 24, although not explicitly shown in FIG. 1, also interfaces with external networks such as the PLMN 16 and the PSTN 18 so that mobile subscribers, such as subscriber unit 22, can communicate with others outside of the traditional wireless telecommunications system 12. The MSC 24 can control or interface with multiple BSCs 32. In many switches, the MSC 24 and the VLR 26 are integrated in the same sub-system.

The combination of the MSC 24, the VLR 26, the HLR 28 and the AuC 30 function to provide mobility management to the wireless telecommunications switch. The VLR 26 provides a database containing information on all active subscriber units of the traditional wireless telecommunications system 12, including roaming subscriber units. An active subscriber unit is one that has requested access to the traditional wireless telecommunications system 12. The database of the VLR 26 provides a temporary subscriber record for each active subscriber unit being served by the MSC 24.

The VLR 26 is operated as part of the signaling network and receives information to generate this temporary subscriber record from the home HLR of each active subscriber unit. For example, the HLR 28 is the home HLR to the subscriber unit 22, whereas the home HLR of a roaming subscriber unit using the traditional wireless telecommunications system 12 would provide information to the VLR 26 through the signaling network provided, for example, through the PLMN 16 for the duration in which the subscriber unit 22 is in the service area of VLR 26. Information in the VLR 26 is generally retained for a set period of time, hence the reference to a temporary subscriber record, and includes such information as the subscriber's International Mobile Subscriber Identity Number (IMSI), information about the subscriber's services and features. The home HLR of a roaming subscriber unit is provided with the address of the traditional wireless telecommunications system 12 so that incoming calls to the roaming subscriber unit can be properly directed. The VLR 26 also works with the MSC 24 and other components to initiate and perform authentication functions to ensure that subscriber units attempting to access the traditional wireless telecommunications system 12 are authentic. The VLR 26 may also assists with recording the location of a local subscriber unit and communicates with the MSC 24 and other sub-systems using signaling information such as SS7 Mobile Application Part (MAP) messages.

The HLR 28 is the central depository for all information required to allow a customer to access and use the wireless telecommunications switch, such as a GSM switch. The information stored in the HLR 28 may be referred to as a subscriber database. The HLR 28 may not store information such as the customer's name or home address, that type of information is often stored in a billing or accounting system and could be stored in the OMC-S 34. The HLR 28 is an intelligent database used to store subscriber related information, such as features and services, and the location information needed to provide wireless telecommunications services. The subscriber information stored in HLR 28 is only for those subscribers that use the traditional wireless telecommunications system 12 as their home system. When these subscribers are roaming and using other wireless telecommunications systems, the HLR 28 provides pertinent information to the VLR of the visited system. The HLR 28 is operated as part of the signaling network. Information and data requests from/to the HLR 28 are provided using the signaling network, such as SS7 MAP messages.

The AuC 30 interfaces with HLR 28 and is used to authenticate a subscriber unit. Authentication is the process whereby a subscriber unit that requests access to a wireless telecommunications system, including roaming subscriber units, must prove it is not a fraud or counterfeit. The AuC 30 operates as part of the signaling network and stores information used in the authentication process for subscribers to the traditional wireless telecommunications system 12. A home AuC, not the AuC 30, is used in the authentication process by roaming subscriber units seeking access to the traditional wireless telecommunications system 12. This home AuC will generally be associated with the roaming subscriber units home wireless telecommunications system. The AuC 30 is defined by Interim Standard (IS-41) Rev. C as a stand-alone network element.

Authentication may be accomplished in a number of different ways, some more secure than others. GSM wireless telecommunications systems are generally considered very secure while many others are not. In some non-GSM systems, secret keys are exchanged between the system and the subscriber unit through the radio interface during authentication. These systems are generally considered less secure because of the increased possibility of intercepting and deciphering the secret keys.

In a GSM wireless telecommunications system, the AuC 30 includes complex mathematical algorithms used in the authentication process and a database to store an encrypted Authentication Key (Ki) corresponding to each of the subscriber units of the traditional wireless telecommunications system 12, but not including roaming subscriber units. The home AuC of each of the roaming subscriber units stores a corresponding encrypted Ki. The complex mathematical algorithms may include an A-3 algorithm and an A-8 algorithm as outlined by the GSM specifications and as determined by each wireless telecommunications system operator. Each of the subscriber units 22, including roaming subscriber units, include a memory, such as a Subscriber Identity Module (SIM) provided as either a "smartcard" or a module, that stores a corresponding encrypted Ki, A-3 algorithm and A-8 algorithm.

The operation of the AuC 30 can best be illustrated after describing the authentication process. The following provides a general description of the authentication process in a GSM wireless telecommunications system. First, the subscriber unit 22 requests access to the traditional wireless telecommunications system 12 and sends its IMSI to the traditional wireless telecommunications system 12. Next, the MSC 24 asks the VLR 26 if it has a record for the subscriber unit 22. If no, the VLR 26 sets up a record by querying the home HLR of the subscriber unit 22 using the signaling network. This will preferably be performed using SS7 MAP messages. If the subscriber unit 22 is a roaming subscriber unit then its home HLR will be queried so that a record can be generated in the VLR 26, otherwise, the HLR 28 will be requested to provide information to the VLR 26.

Once a record for the subscriber unit 22 is established in the VLR 26, each time the subscriber unit 22 seeks to access the traditional wireless telecommunications system 12, the VLR 26 asks the home HLR to initiate the generation of authentication triplets in the home AuC for the subscriber unit 22. Assuming that the home HLR is the HLR 28, the VLR 26 asks the HLR 28 to provide authentication triplets for the subscriber unit 22. The HLR 28 then requests the authentication triplets from the AuC 30. The AuC 30 can then provide either previously generated and stored authentication triplets or it can generate them when requested. The AuC 30 generates the authentication triplets by generating a Random Number (RAND), decrypting the Ki associated with the subscriber unit 22 and using RAND and the decrypted Ki as inputs to the A-3 algorithm and the A-8 algorithm. The A-3 algorithm at the AuC 30 generates a network Signed Response (SRES) as an output, and the A-8 algorithm at the AuC 30 generates a network Ciphering Key (Kc) as an output. The network Kc is used later to encrypt the information provided over the air or radio interface. The combination of RAND, network SRES, and network Kc are referred to as the authentication triplets. Because these mathematical algorithms are very processor intensive, the generation of SRES and Kc may be time consuming. Thus, the AuC 30 may have to pregenerate and store several sets of authentication triplets for each of its subscribers so that these triplets are readily available when needed to authenticate one of its subscriber units. As can be seen, the storage and, hence, availability of pregenerated authentication triplets potentially reduces overall system security.

The A-3 algorithm and the A-8 algorithm may be referred to as one-way or trap-door functions because Ki cannot be easily determined even if several pairs of RAND and outputs, such as SRES or Kc, are known. Thus, Ki is never sent through the signaling network and is only stored in the AuC 30 in an encrypted state. This, along with the fact that each system operator may implement different versions of the A-3 algorithm and the A-8 algorithm, drastically reduces the possibility of fraud in a GSM wireless telecommunications system. The GSM specifications have defined the size of RAND to be 128 bits long and the size of SRES to be 32 bits long.

Next, the authentication triplets, including the PAND, the network SRES, and the network Kc, are provided to the VLR 26 via SS7 MAP messages. The RAND is then provided to the SIM of subscriber unit 22. The SIM of subscriber unit 22 generates a corresponding subscriber SRES and, sometimes, a subscriber Kc using the locally provided encrypted Ki, A-3 algorithm and A-8 algorithm, respectively. The subscriber SRES is then provided back to the VLR 26 for comparison with the network SRES. If these values are the same, the subscriber unit 22 is authenticated, otherwise, it is not.

The AuC 30 also assists with encryption of the information exchanged between the subscriber unit 22 and the BTS 20 over the air or radio interface. As mentioned above, the network Kc and the subscriber Kc are used later to encrypt the information provided over the air or radio interface. This increases privacy and security and eliminates eavesdropping.

Although not expressly shown in FIG. 1, the various sub-systems of the traditional wireless telecommunications system 12, such as the VLR 26, the MSC 24, the HLR 28 and the AuC 30 communicate using a Mobile Application Part (MAP) and interface with the signaling network through a MAP Provider. The MAP Provider provides an interface to a Transaction Capabilities Application Part (TCAP) of the SS7 protocol.

The OMC-S 34 is another dedicated sub-system designed to manage and monitor the wireless telecommunications switch that includes the MSC 24, the VLR 26, the HLR 28 and the AuC 30. The dedicated OMC-S 34 and the dedicated OMC-R 36 are identified in the GSM specifications. The OMC-S 34 receives event alarms and system status/operational information that is critical to the operation of the traditional wireless telecommunications system 12. These alarms and system status/operational information may be logged for future analysis if needed. The OMC-S 34 may also be used to control, start and shut down certain equipment. Just as with the OMC-R 36, the OMC-S 34 will also generally be manufactured by the same company that manufactures the wireless telecommunications switch that it manages and monitors. In addition to its network operations and maintenance functions, the OMC-S 34 may also interface with a subscription management system.

The subscription management system may access and modify subscriber information stored in the subscriber database of the HLR 28. For example, the subscription management system may be used to update the subscriber information stored in the HLR 28, to add new subscribers including a Ki in the database of the AuC 30, to modify an existing subscriber's profile and to change the services and features available to the subscriber. The subscription management system may also receive and store operational statistics related to call processing that may then be used for accounting and billing.

Referring now to the exemplary integrated wireless telecommunications system 14, many of the components or sub-systems of the traditional wireless telecommunications system 12 have been integrated to provide the novel solution illustrated by the integrated wireless telecommunications system 14. Generally, the functionality of the BSC 32, the MSC 24, the VLR 26, the HLR 28 and the AuC 30 of the traditional wireless telecommunications system 12 has been integrated in the integrated wireless telecommunications system 14 as a call processor 40 and a resource assembly 60. The call processor 40 provides the overall switching and subscriber control to the integrated wireless telecommunications system 14 using signaling information and subscriber information. Similarly, the functionality of the OMC-S 34 and the OMC-R 36 has been generally integrated into a Network Management System-Server (NMS-S) 70 and a Network Management System-Client (NMS-C) 90. In one embodiment, the call processor 40, the resource assembly 60, the NMS-S 70, and the NMS-C 90 communicate through a Local Area Network (LAN), such as an Ethernet LAN. The integrated wireless telecommunications system 14 is described more fully below and in connection with FIG. 2 where a more detailed implementation of the exemplary integrated wireless telecommunications system 14 is presented.

The resource assembly 60 provides the physical connections with the one or more BTSs 20, the PLMN 16 and the PSTN 18 so that voice, data and signaling information may be exchanged. The resource assembly 60 may include any number of redundant circuit modules and controllers such as an interface module, a switching module, a telephony support module and a signal processing module. The interconnections with the one or more BTSs 20, the PLMN 16 and the PSTN 18 may be provided through the interface module, such as a quad span module, so that information may be exchanged through a telecommunications link or span such as, for example, an E-1 or T-1. The switching module may include a switching matrix to connect calls from sender to receiver and bus arbitration circuitry to arbitrate a control bus and a high speed bus, such as a Pulse Code Modulation (PCM) bus, of the resource assembly 60. The high speed bus can carry both voice and data.

The telephony support module of the resource assembly 60 may generate all needed tones such as trunk tones for trunk signaling and busy tones that may be provided on the high speed bus as needed. The telephony support module may also generate or store pre-recorded messages for playback as needed. Finally, the signal processing module may include one or more digital signal processors (DSPs) and associated software to perform echo cancellation when needed and to serve as a TRAU as described previously with respect to the BSC 32. Each of those modules of the resource assembly 60 preferably include software. Although the functionality of the resource assembly 60 has been described with respect to various modules, it should be understood that the functionality could be achieved using virtually any combination of software and hardware, with our without modules.

The call processor 40 uses signaling information and subscriber information to provide the overall switching control and subscriber control to the functionality provided by the resource assembly 60. In an exemplary embodiment, the call processor 40 may be implemented using a dedicated computer, such as a personal computer motherboard using an Intel Pentium microprocessor, and various software processes or applications that include software objects. The call processor 40 may also operate under the control of an operating system capable of processing real-time data such as, for example, the QNX operating system, the MICROSOFT WINDOWS NT operating system, or the like.

Figure 2:
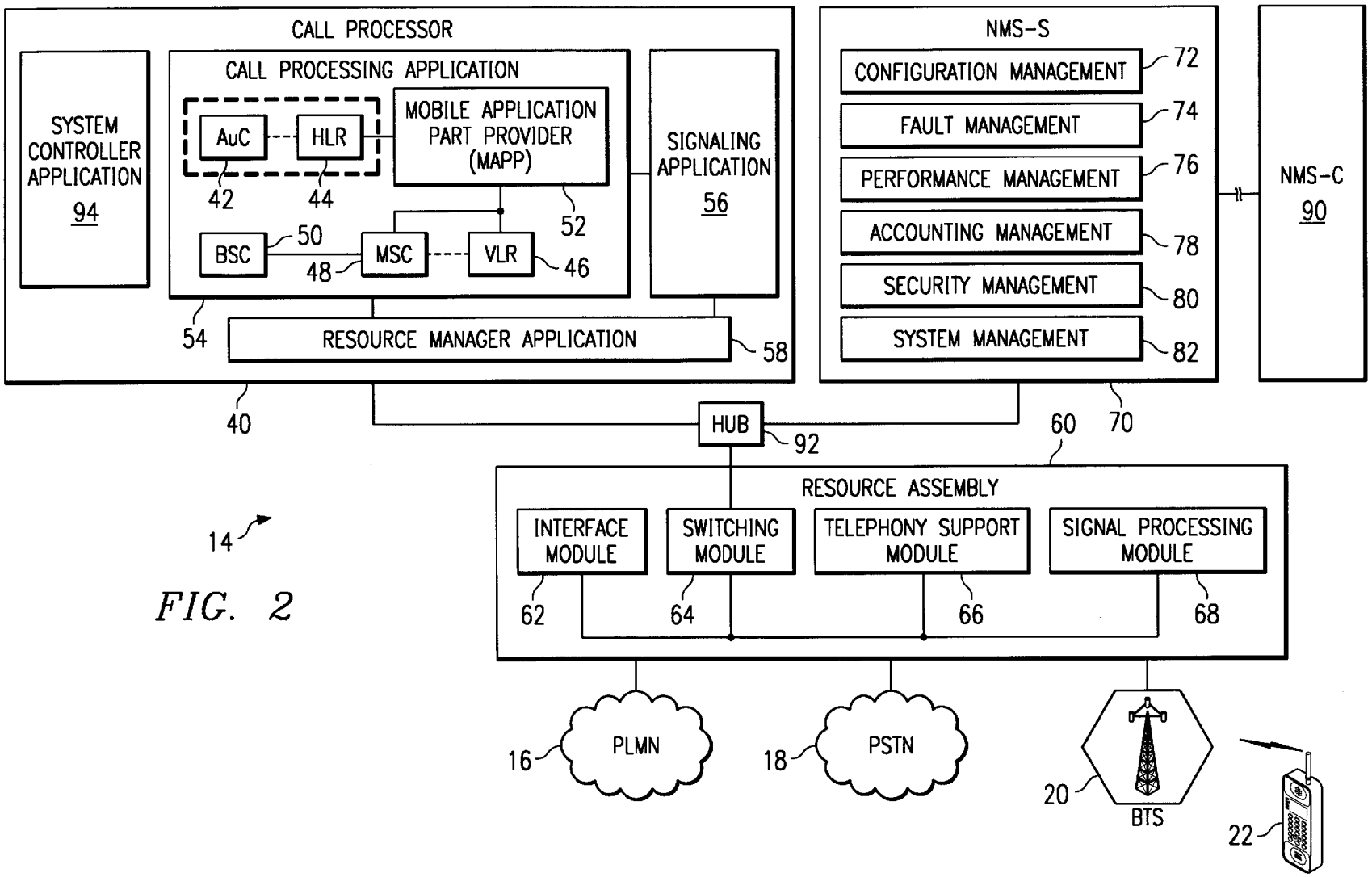
FIG. 2 is a block diagram illustrating the functional blocks of the exemplary integrated wireless telecommunications system in more detail.

The call processor 40, which is illustrated in more detail in FIG. 2, includes an application process that comprises the following objects: an Authentication Center (AuC) 42, a Home Location Register (HLR) 44, a Visitor Location Register (VLR) 46, a Mobile Switching Center (MSC) 48, and a Base Station Controller (BSC) 50. The AuC 42 and the HLR 44 may be integrated in one software object or as two separate objects of the same application process or executable file. The AuC 42 and the HLR 44 may serve multiple telecommunications switches in addition to the one provided in the integrated wireless telecommunications system 14. These software objects provide related control functionality to the dedicated, and often separate, systems previously described for the traditional wireless telecommunications system 12. Although not expressly illustrated in FIG. 1, the call processor 40 will also include a Mobile Application Part Provider (MAPP) and a signaling application that are used to coordinate communication with the signaling network and to provide an interface to a TCAP of the SS7 protocol. The MAPP and signaling application may be implemented as software objects and are illustrated more fully below in connection with FIGS. 2 through 6. The MAPP allows any of the sub-systems of the call processor 40, such as the AuC 42, the HLR 44, the VLR 46 and the MSC 48, to efficiently communicate with one another without having to use TCAP and other SS7 layers and protocols. This reduces overall congestion and loading of the signaling network while reducing the processor loading on the call processor 40

Each of the software objects of the call processor 40 will generally contain procedures, sometimes referred to as methods in object-oriented programming terminology, and data, sometimes referred to as variables or data elements. The software objects communicate with one another using a message. A message is provided from a sender software object to a receiver software object and includes the name of the receiver software object and the name of the procedure or method to be executed by the receiver software object. The message may also include a parameter for use by a procedure.

The call processor 40 may communicate with the resource assembly 60 and the NMS-S 70 through the Ethernet LAN. In an exemplary embodiment, the call processor 40 communicates with the NMS-S 70 using an Object Request Broker (ORB) such as the Common Object Request Broker Architecture (CORBA) developed by the Object Management Group (OMG). This provides standard object-oriented interfaces between external applications and platforms to provide interoperability of object-oriented software systems residing on disparate platforms. In an exemplary embodiment, the call processor 40 communicates with the resource assembly 60 using Sockets so that Transmission Control Protocol / Internet Protocol (TCP/IP), or the like, can be used for exchanging information.

The AuC 42, which may be implemented in the same software object as the HLR 44, may include a procedure to generate an authentication set or authentication triplets in response to the subscriber unit 22 requesting access to the integrated wireless telecommunications system 14. This request is generally received at the HLR 44 from the VLR 46 which in turn requests the AuC 42 to generate the authentication set for this subscriber unit 22. The request may come in the form of a message that requests the execution of a procedure in the AuC 42 and a parameter that includes the IMSI of the subscriber unit 22 being authenticated. The AuC 42 also preferably includes a database of encrypted Kis for each subscriber unit, such as subscriber unit 22, that uses the integrated wireless telecommunications system 14 as its home system, an A-3 algorithm and an A-8 algorithm. The A-3 algorithm and the A-8 algorithm may be provided as one or more procedures of the AuC 42.

In one embodiment, the AuC 42 generates the authentication set by decrypting the Ki corresponding to the IMSI and generating a RAND. The Ki and the RAND are then used as inputs to the A-3 algorithm to generate an SRES and as inputs to the A-8 algorithm to generate a Kc. The RAND, the SRES and the Kc are then provided to the requesting VLR, the VLR 46 in this case, so that the RAND can be sent to the subscriber unit 22 to complete the authentication. The subscriber unit 22 then generates a a corresponding subscriber authentication set or triplets including SRES. Any portion of the subscriber authentication set or triplets, such as SRES and Kc, may be referred to as subscriber authentication information. If the subscriber unit 22 is able to successfully generate and transmit back a subscriber SRES corresponding to the network SRES, the subscriber unit 22 will be authenticated by the VLR 46. Authentication may also require the subscriber unit 22 to successfully generate and transmit back a subscriber Kc corresponding to the network Kc.

The HLR 44 and the VLR 46 perform the same general functions previously described for the HLR 28 and the VLR 26. The HLR 44 and the VLR 46 include databases with subscriber information. The MSC 48 and the BSC 50 also perform the same general functions previously described for the MSC 24 and the BSC 32 with a few noted exceptions. The MSC 48 controls the switching of calls, collects the details of calls made, and supervises the operation of the remainder of the switch. The MSC 48 is in contact with its mobile subscribers through the BSC 50 and the resource assembly 60. The interface between the MSC 48 and the BSC 50 can still be maintained as an A type interface as defined by the GSM specifications and, in an exemplary embodiment, will be provided using CORBA for communication between these two software objects. The MSC 48 controls a switching matrix of the resource assembly 60, such as the switching matrix of a switching module. It should also be mentioned that, just as with the VLR 26 and the MSC 24, the VLR 46 and the MSC 48 may be integrated. Thus, the VLR 46 and the MSC 48 may be implemented in the same software object.

The BSC 50 is implemented as a software object to manage the radio resources for the one or more BTSs 20, including radio-channel setup, frequency hopping and handovers, through the resource assembly 60. The BSC 50 preferably does not include a TRAU like the BSC 32. As mentioned above, the TRAU may be provided in the resource assembly 60.

The NMS-S 70 and the NMS-C 90 communicate with one another through the Ethernet LAN using CORBA, which is platform independent. The NMS-C 90, in one embodiment, may be implemented using a personal computer provided local or remotely to the NMS-S 70 and operating under the control of an operating system such as, for example, MICROSOFT WINDOWS 95, MICROSOFT WINDOWS NT CLIENT, and the like. If the NMS-C 90 is provided remotely, a modem, not shown in FIG. 1, will generally be provided to enable communication with the NMS-S 70. The NMS-C 70, in one embodiment, may be implemented using a dedicated computer, such as a personal computer motherboard using an Intel Pentium microprocessor, similar to the call processor 40. The NMS-S 70 preferably operates under the control of an operating system such as MICROSOFT WINDOWS NT SERVER and the like.

The NMS-S 70 and the NMS-C 90 include software processes or applications that include software objects used to perform the operations and maintenance previously performed by dedicated and distinct systems such as the OMC-S 34 and the OMC-R 36. This includes such functions as managing and monitoring the operations of the BSC 50 and the one or more BTSs 20, the MSC 48, the VLR 46, the HLR 44 and the AuC 42. The NMS-S 70 may receive and log event alarms and system status/performance information. This information may be viewed, as desired, by the NMS-C 90. The NMS-S 70 and the NMS-C 90 may also provide subscription management so that subscriber information may be accessed and modified as desired. This, of course, does not include a subscriber's decrypted Ki which should remain confidential, even from operations personnel. Subscription management may also allow subscription information provided in the HLR 44 and the AuC 42 to be updated. Further, the subscription management of the NMS-S 70 and the NMS-C 90 may also provide call processing information that may then be used for the accounting and billing functions needed for the integrated wireless telecommunications system 14.

In an exemplary embodiment, the NMS-S 70 may be enabled with web server software such as NETSCAPE COMMUNICATOR, MICROSOFT WINDOWS NT, and the like while the NMS-C 90 may be enabled with web browser software such as NETSCAPE NAVIGATOR, MICROSOFT EXPLORER, and the like. In such a case, the NMS-90 can access the NMS-70 through the Internet or through an intranet using a familiar graphical user interface. This provides significant flexibility when monitoring and operating the integrated wireless telecommunications system 14 and decreases the training time needed to train operations personnel. The NMS-S 70 and the NMS-C 90 also provide the significant advantage of allowing all data entry to be performed at one location, i.e., the NMS-C 90. This is in contrast to other systems where data must be entered, sometimes the same data, in multiple systems. In addition to the additional labor and time needed to enter data, the opportunity is present for the same data to be entered differently in different systems. In such a case, unpredictable results occur.

FIG. 2 is block diagram illustrating functional blocks of the exemplary integrated wireless telecommunications system 14 in more detail. The exemplary integrated wireless telecommunications system 14 is designed to be compatible with the GSM specifications and includes the call processor 40, the NMS-S 70, the NMS-C 90, a hub 92 and the resource assembly 60. The PLMN 16, the PSTN 18, and the one or more BTSs 20, including the one or more subscriber units 22, are illustrated in communication with the resource assembly 60. The call processor 40, in one embodiment, includes a call processing application 54, a signaling application 56, a system controller application 94 and a resource manager application 58. Each of these applications preferably include at least one computer software object that can communicate with other software objects of the call processor 40 using an ORB, such as CORBA or the like. It should be mentioned that these various computer software objects may be developed using virtually any computer programming language but will preferably be developed using a computer programming language designed for object-oriented programming such as C++, Virtual C++, JAVA and the like.

The system controller application 94 is responsible for ensuring that the call processor 40 is operating properly by periodically testing the other applications of the call processor 40. A successful test of an application of the call processor 40 may comprise, for example, observing a predetermined response from the application after sending a predetermined message to the application. This may be referred to as "pinging."

The signaling application 56 provides the logic needed to provide signaling functionality to the integrated wireless telecommunications system 14. More specifically, the signaling application 56 provides SS7 functionality to the call processing application 54 so that the integrated wireless telecommunications system 14 will have SS7 connectivity to the PLMN 16 and the PSTN 18. The SS7 functionality of the signaling application 56 may be grouped into call-setup functions and non call-setup or transaction functions. The call-setup functions are concerned with setting up and then releasing or tearing down calls, while the non call-setup or transaction functions involve providing services that generally require a database query to determine how to proceed with a call.

The signaling application 56 is responsible for performing various functions and providing user interfaces associated with the various parts and protocols of SS7. SS7 provides a transport mechanism for exchanging signaling information, such as MAP messages, using out-of-band signaling. SS7 signals include several parts, each having a distinct protocol. Specifically, SS7 signals include: (a) a three lower layer Message Transfer Part (MTP), which apply to basic routing of signaling messages between signaling points, (b) a Signaling Connection Control Part (SCCP) and a Transaction Capabilities Application Part (TCAP), which apply to additional routing and management functions for the transfer of messages and for database queries used for non call-setup or transaction functions such as the exchange of MAP messages, and (c) a Telephone User Part (TUP) and an Integrated Services User Part (ISUP), which apply generally to setting up, coordinating and taking down trunk calls and other call-setup functions. Although the signaling application 56 may be implemented in any of a variety of ways, one embodiment includes providing the upper SS7 layers, such as the TCAP, the SCCP and the highest MTP layer as software objects of the call processor 40, while the lower two MTP layers may be provided as part of a signaling line card that interfaces with the call processor 40. The signaling line card may provide a direct physical connection to an interface module 62 of the resource assembly 60 so that signaling information may be efficiently exchanged with the resource assembly 60.

The signaling application 56 is in communication with the resource manager application 58 and a Mobile Application Part Provider (MAPP) 52 and the MSC 48 of the call processing application 54. The MAPP 52 may be implemented as one or more software objects. The MAPP 52 and the signaling application 56 allow MSCs, VLRs and HLRs whether residing on the same or different nodes, to carry on MAP dialogues. The MAPP 52, which is described more fully below in connection with FIGS. 4 through 6, determines whether a MAP message is destined for a sub-system of the integrated wireless telecommunications system 14 or a sub-system of another node. The MAPP 52 communicates the MAP messages destined for a sub-system of integrated wireless telecommunications system 14 to the appropriate sub-system while converting the MAP messages destined for another node to a TCAP message for use by the signaling application 56. In this manner, MAP dialogues between the VLR 46, the HLR 44 and the MSC 48 may be efficiently handled without requiring the use of the signaling application 56. This significantly reduces processor loading of the call processor 40.

The resource manager application 58 serves as the "bridge" or "conduit" between the call processor 40 and the resource assembly 60. The resource manager application 58 manages and allocates the resources of the resource assembly 60 with respect to the call processor 40 and enables different applications of the call processor 40 to interface with resources of the resource assembly 60. Preferably, the resource manager application 58 also provides an interface to resources of the resource assembly 60 for the signaling application 56 as well as other elements, such as the system controller application 94 and various elements of the NMS-S 70.

The resource manager application 58 is preferably implemented in software using object-oriented programming, and achieves the management and allocation of resources by employing ORB technology, such as CORBA. In accordance with an exemplary embodiment, the resource manager application 58 provides a proxy object for each object or application outside the resource manager application 58 which may seek to interface with the resource manager application 58. Similarly, each such object or application is provided with a counterpart proxy object. An interface is defined between each proxy object of the resource manager application 58 and the object or application to which it corresponds, as well as between each counterpart proxy object and the resource manager application 58. An interface can be defined (such as by using Interface Definition Language or IDL) to establish acceptable messages and responses that can be exchanged over the defined interface. When a particular object or application desires to interface with a resource of the resource assembly 60, a message is sent from that object or application to the counterpart proxy object of that element or application. That counterpart proxy object then, in turn, forwards the request to the resource manager application 58 in conformance with the defined interface. Similarly, when the resource manager application 58 desires to interface with a particular object or application (for example, the call processing application 46) with respect to a resource of the resource assembly 60, a message is sent to the proxy object of the resource manager application 58 corresponding to the particular object or application. That proxy object then, in turn, forwards the request to the particular object or application in conformance with the defined interface.

The call processing application 54 includes various software objects, all of which have been previously introduced and described in relation to FIG. 1. Once again the BSC 50 is responsible for management of the BTSs 20 and their radio interfaces with subscriber units 22, including the allocation and release of radio channels associated with a given radio interface and management of handovers from one BTS 20 to another BTS 20. The BSC 50 manages the one or more BTSs 20 and their radio interfaces through the allocation, release and handover of radio transmission channels. The BSC 50 may carry out various procedures that relate to call connection tasks. For example, the BSC 50 may be responsible for system information broadcasting, subscriber paging, immediate traffic channel assignment, subsequent traffic channel assignment, call handover, radio connection and release, connection failure detection and reporting, and power capability indication reporting. The BSC 50 may also be responsible for management of both the Abis link and the A interface. In an exemplary embodiment, the BSC 50 controls a TRAU provided in a signal processing module 68 of the resource assembly 60 through the resource manager application 58.

The MSC 48 and the VLR 46 may be integrated together or separately, as indicated by the dashed line in FIG. 2. The MSC 48 controls the switching of calls, collects the details of calls made, and supervises the operation of the remainder of the switch. The MSC 48 is primarily responsible for mobility management, call control and trunking, such as coordinating the setting-up and termination of calls to and from the subscriber units 22. Additionally, MSC 48 provides all of the functionality needed to handle the mobility of the one or more subscriber units 22 through location updating, handover and call delivery.

The MSC 48 is in contact with the subscriber units 22 through the A type interface with the BSC 50, the resource manager application 58 and the resource assembly 60. The A interface provides the link for managing traffic channels/transcoders, and also provides the MSC 48 with access to the Abis interface for message flow with the subscriber units 22. The Base Station Subsystem Management Application Part (BSSMAP) protocol may be employed to transmit connection-related messages and paging messages between the MSC 48 and BSC 50. The MSC 48 controls a switching matrix of a switching module 64 of the resource assembly 60. For example, the MSC 48 is operable to process a service request from the subscriber unit 22, and route a corresponding call to a designated destination such as the PLMN 16, the PSTN 18 or to another one of the subscriber units 22. Similarly, the MSC 48 is operable to process a service request from a remote subscriber through, for example, the PLMN 16, or the PSTN 18 and route a corresponding call to a designated one of the subscriber units 22.

The VLR 46, the HLR 44 and the AuC 50 function as previously described in detail with respect to FIG. 1 except that the MAPP 52 is expressly provided to allow the VLR 46 and the HLR 48 to exchange MAP messages. The dashed line between the HLR 44 and the AuC 50 indicates that these software objects could be implemented as distinct software objects or as one software object having the same functionality. The VLR 46 provides a database containing information on all active subscriber units of the exemplary integrated wireless telecommunications system 14, including roaming subscriber units. Whenever an active subscriber unit such as the subscriber unit 22 requests service, an authentication must be performed. The authentication will include the subscriber units home AuC, which, in this case, is the AuC 42.

As discussed above, the MAPP 52 may work with the signaling application 56 when it receives a request from the VLR 46 to send a MAP message, such as a request to perform an authentication, to the HLR 44. The MAPP 52 is the logical link between the VLR 46 and the HLR 44 and provides the dialogues through which they communicate with each other and with other elements and objects. Since the HLR 44 and the VLR 46 are both sub-systems at the same node, the MAPP 52 provides this dialogue directly without having to use the signaling application 56. Otherwise, the MAPP 52 converts a MAP message destined for a sub-system of another node to a TCAP message for use by the TCAP of the signaling application 56 for non-call related signaling. Thus, a MAP messages between the VLR 46 and an external HLR will be converted to a TCAP message while messages between the VLR 46 and an HLR 44 will not. Authentication sets or triplets may be provided from the HLR 44 to the VLR 46 using the MAPP 52.

The NMS-S 70, in an exemplary embodiment, includes several elements for configuring and managing elements of the call processor 40 and the various resources of the resource assembly 60. Specifically, the NMS-S 70 includes a configuration management element 72, a fault management element 74, a performance management element 76, an accounting management element 78, a security management element 80, and a system management element 82. These elements provide operations, administration, maintenance and provisioning related services, and preferably include one or more logical servers or software objects. These elements of the NMS-S 70 may be implemented as software objects using object-oriented technology. These elements or objects may be accessed using the NMS-C 90, which serves as a client to the NMS-S 70.

The configuration management element 72 includes one or more objects to provide services necessary to administer the configurable attributes of the main functional elements associated with the call processing application 54, the resource manager application 58 and the signaling application 56. For example, the configuration management element 72 may be used to modify subscriber databases of the call processing application 54, as well as to configure of specific elements or objects of the call processing application 54, such as the BSC 50 and the MSC 48. In one embodiment, the NMS-C 90 provides a configuration Graphical User Interface (GUI) that identifies the various applications and or objects of the call processor 40 to allow an operator to configure the corresponding functional components of the call processing application 54, the resource manager application 58 and the signaling application 56 using the servers of the NMS-S 70. The fault management element 74 provides for the detection, logging and reporting of alarms, errors, and selected events from the call processor application 54 and the resource assembly 60. The performance management element 74 provides for the periodic collection and analysis of system performance and traffic information from the resource assembly 60 and the call processing application 54.

The accounting management element 78 attends to the creation and storage of billing records for calls originated or terminated to the subscriber unit 22, as well as calls forwarded to or from the subscriber unit 22. Such billing records are in the form of a call data record and may be presented or generated as desired. The security management element 80 provides for discriminatory access to operation, administration and maintenance operations based on the given operator of the NMS-S 70, which is provided through the NMS-C 90. Various security levels are defined that determine the operations that are available to a given operator. In one embodiment in which the NMS-S 70 utilizes MICROSOFT WINDOWS NT SERVER as its operating system and the NMS-C 90 utilizes MICROSOFT WINDOWS NT CLIENT as its operating system, the security functions provided by these operating systems may be used to implement the functions of the security management element 80. Finally, the system management element 82 supports the start-up and recovery functions of the integrated wireless telecommunications system 14. The system management element 82 is operable to initiate tests to assess the operation of various elements, objects and resources, and to cause the reset of such elements and resources in the event of incorrect operation.

The resource assembly 60 provides the physical connections with the one or more BTSs 20, the PLMN 16 and the PSTN 18 so that voice, data and signaling information may be exchanged and is controlled and monitored by the call processor 54 and the NMS-S 70. The resource assembly 60 may include any number of redundant circuit modules, control busses and high speed busses. For example, in addition to the switching module 64 and the signal processing module 68, which have already been introduced, the resource assembly 60 includes an interface module 62 and a telephony support module 66. In an exemplary embodiment, the signal processing module 68, the interface module 62 and the telephony support module 66 interface through one or more of the switching modules 64. Control information is provided to these modules by the switching module 64 over a control bus, while data or information is provided to these modules by the switching module 64 over a high speed bus.

The switching module 64 may be implemented in software, hardware or a suitable combination of software and hardware. The switching module 64 preferably performs switching operations, clock operations, and local communications between resources of the resource assembly 60 of the integrated wireless telecommunications system 14. These operations may be performed using pulse code modulation switching and data transfer techniques, Link Access Protocol on the D Channel (LAP-D) communications and Ethernet interface communications.

A switch preferably resides within the switching module 64 to perform the switching functions and operations. The switch may be a timeslot switch having a memory timeslot matrix to make required timeslot cross-connections within the integrated wireless telecommunications system 14. The switch functions to set up and tear down both simplex and duplex connections between two specified channels, which may represent a call or other useful connections. For example, the switch may cause a channel (provided by, for example, the BTS 20 or the PSTN 18) to connect to a call progress tone or a voice announcement. Further, the switch may also set up system defined connections upon power up and reset as well as connections for the testing of timeslots when not in use. Timeslots are preferably provided to the timeslot switch via the high speed bus.

The switching module 64 may also, for example, include suitable digital data processing devices, a processor, random access memory and other devices. Preferably, each switching module 64 runs a suitable operating system, and includes one or more pulse code modulation bus interfaces, one or more High Level Data Link Controller (HDLC) control bus interfaces, one or more Ethernet interfaces, and an arbitration bus interface to other switching modules 64.

The telephony support module 66 may be implemented in software, hardware or a suitable combination of software and hardware. The telephony support module 66 may, for example, provide tone generation, digit transceiver functions, and digitized announcements. The telephony support module 66 may also provide call setup functions, such as digit collection and out-pulsing, and call completion functions, such as digitized announcement generation and call supervisory tone generation. The telephony support module 66 may, for example, include suitable telecommunications data processing equipment, such as a processor, random access memory, one or more redundant High Level Data Link Controller bus interfaces, one or more pulse code modulation buses, and an arbitration bus for establishing an active telephony support module 66 status. Preferably, a single telephony support module 66 provides all required telephony support functionality for the integrated wireless telecommunications system 14, and the one or more additional telephony support modules 66 are used to provide redundancy in the event of component or module failure.

The interface module 62 is an interface device that is used to interface a suitable number of telecommunications lines that carry data in a predetermined format, such as an E1 data format, with the integrated wireless telecommunications system 14. The one or more interface modules 62 provide the physical interface with other equipment, the PSTN 18, the PLMN 16 and the one or more BTSs 20. The interface module 62 also supports in-band trunk signaling for DS0 data channels that are configured for channel associated signaling, and transmit data to and receive data from the signal processing module 68. The interface module 62 may be implemented in software, hardware or a suitable combination of software and hardware. For example, the interface module 62 may include suitable data processing equipment, such as a processor, random access memory, four E1 ports, redundant High Level Data Link Controller bus interfaces, and pulse code modulation bus interfaces.

The signal processing module 68 is preferably used to provide an interface between the call processor 40 and the signaling system. For example, signaling data may be received from a data transmission channel from the PSTN 18, and may be switched to another data transmission channel, such as an E1 telecommunications channel, from an interface module 62 to a signal processing module 68 by a switching module 64. A signal processing module 68 is also preferably employed to perform transcoding and rate adaption functions, such as converting from a wireless system speech encoding format to a pulse code modulation data format as well as other functions, such as echo cancellation functions. For example, signal processing module 68 may be employed by the integrated wireless telecommunications system 14 to convert data from the GSM data format to another format, such as the pulse code modulation data format.

One or more digital signal processors (DSPs) are preferably provided within the signal processing module 68. A multi-channel TRAU is preferably implemented in a DSP. That is, one or more DSPs preferably incorporate functions associated with the TRAU. Such DSPs preferably include multiple input and output buffers for storing multiple channel audio data, and perform rate adaption through an interrupt-driven routine that places the appropriate channel data onto both the near-end and far-end transmission lines at the appropriate data rate. With the implementation of rate adaption, such DSPs also have further processing power available to perform encoding and decoding of the incoming audio data. In addition to functions associated with the TRAU, an echo-cancellation capability may be advantageously provided by the DSPs by utilizing the already robust voice activity detection bits produced in transcoding a signal.

An E1 or T1 transmission line providing a 16,000 bits per second signal, which may carry four traffic channels, may be coupled to an interface module 62. That signal may, in turn, be connected to a DSP of the switching module 64 over the high speed bus. A DSP is further connected to a 64,000 bits per second transmission line also capable of carrying, for example, four traffic channels. The 64,000 bits per second transmission line can be, for example, a 64,000 bits per second PCM line. These lines are functionally bi-directional; each transmission line is connected to both an input and output of the DSP. The DSP may be further connected via an address bus, a data bus, and a control bus to at least one random access memory and at least one read only memory device, in a conventional manner. The DSP used in this exemplary embodiment can be, for example, an Analog Devices 2106x digital signal processor chip.

The signal processing module 68 may be implemented in software, hardware or a suitable combination of software and hardware. In addition to one or more DSPs, the signal processing module 68 may include suitable data processing equipment, such as a processor, random access memory, four daughter board module ports, redundant High Level Data Link Controller bus interfaces, pulse code modulation matrix bus interfaces and other signal processing application hardware.

In operation, a subscriber unit 22 may attempt to place a call using the exemplary wireless telecommunications system 14 by the following procedures. Signaling data and other call control data is received from the BTS 20 in an E1 data format at the interface module 62. That data is then switched through the switching module 64 to the telephony support module 66, which performs call setup functions. The call processor 40 receives the signaling data, and determines the call destination. Depending upon the call destination, the call processor 40 sends signaling and call control data to the PSTN 18, another telecommunications system, or a BTS 20 serviced by the integrated wireless telecommunications system 14. If a telecommunications channel cannot be established, a busy signal, a no answer message, or another appropriate response is generated by the telephony support module 66, and the call attempt is terminated. If a telecommunications channel can be established, the call processor 40 configures the switching module 64, the telephony support module 66, the interface module 62, and the signal processing module 68 to process the call data. A similar process is also used to handle incoming telecommunications channels from, for example, PSTN 18 or other telecommunications switches, or to de-allocate elements of the integrated wireless telecommunications system 14 after a call is completed.

The call processor 54, the resource assembly 60 and the NMS-S 70 may communicate with one another through the hub 92. Preferably, the hub 92 is provided as an Ethernet hub so that information may be exchanged between the various elements and objects as needed. The NMS-S 70 and the NMS-C 90 preferably communicate with one another through a hub, not expressly shown in FIG. 2, such as an Ethernet hub, using CORBA. However, the NMS-C 90 may be located locally or remotely with respect to the NMS-S 70. When located remotely, a modem or other communication device may be employed to allow communication between the NMS-S 70 and the NMS-C 90. It should also be noted that more than one NMS-C 90 may access and communicate with the NMS-S 70, and, in other embodiments, the NMS-C 90 may access and communicate with more than one NMS-S 70.

Once again, while the exemplary integrated wireless telecommunications system 14 of FIG. 2 was designed as a GSM system, it should be appreciated and understood that the present invention should not be construed to be so limited. Rather, the present invention is equally applicable to use with technologies and applications other than GSM, including, among others, PCS, CDMA and TDMA technologies.

Figure 3:
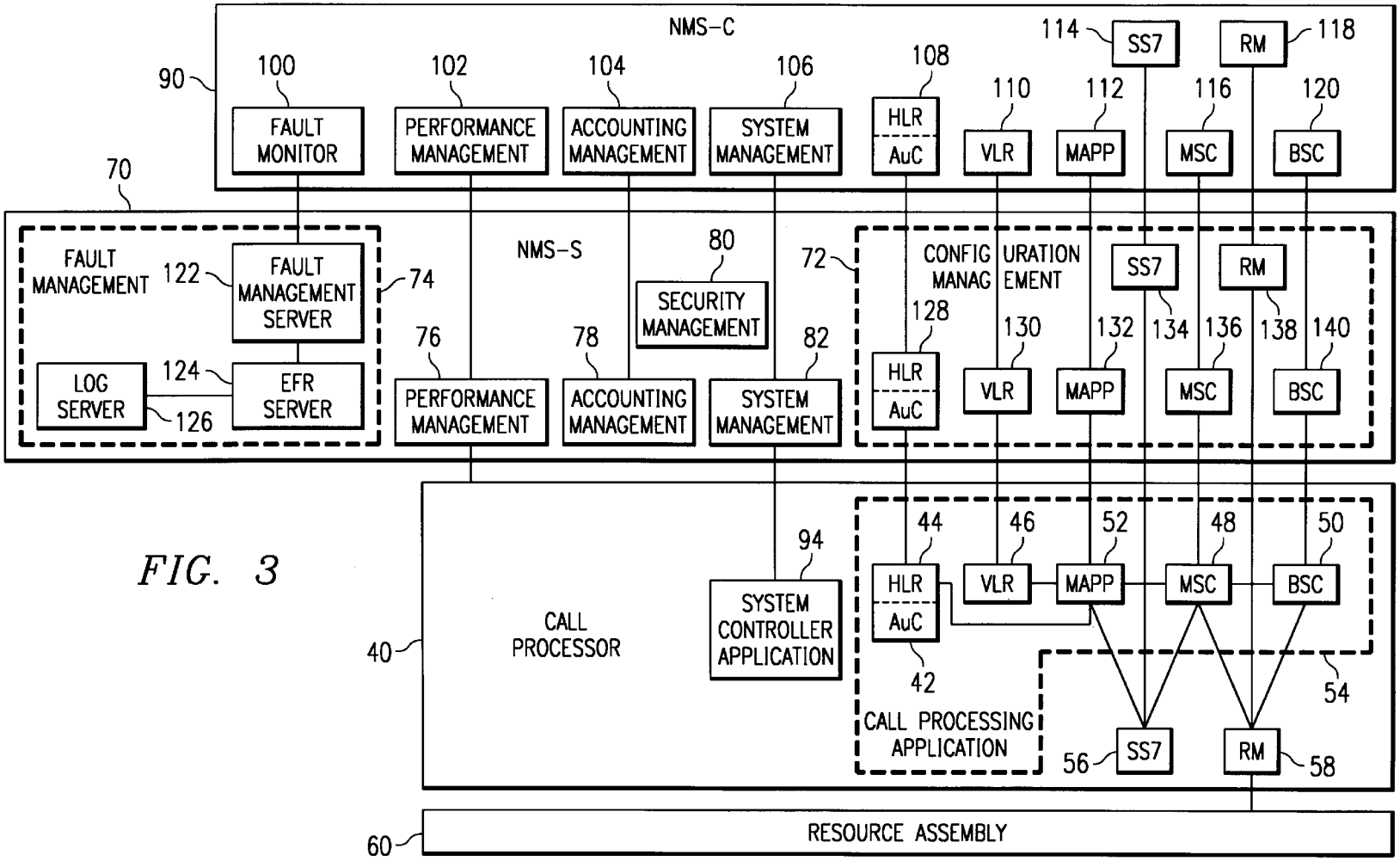
FIG. 3 is a block diagram illustrating various software application processes, that include one or more software objects, of the exemplary integrated wireless telecommunications system.

FIG. 3 is a block diagram illustrating exemplary software application processes, that include one or more software objects, of the integrated wireless telecommunications system 14 according to the teachings of the present invention. More specifically, FIG. 3 illustrates various software objects of the NMS-C 90, the NMS-S 70, and the call processor 40. The connection between the call processor 40 and the resource assembly 60 is also illustrated.

As discussed above in connection with FIG. 2, the resource assembly 60 preferably includes a switching module 64, a telephony support module 66, a signal processing module 68 and an interface module 62. Each of these modules preferably include software and communicate with the resource manager application 58 of the call processor 40. These modules preferably include specific resources that can be employed and controlled by the call processor 40. Alternatively, specific resources may be distributed amongst the various modules of the resource assembly 60. It should therefore be recognized and appreciated that the allocation of resources within the resource assembly 60 is not pertinent to the scope of the present invention.

The software architecture of the exemplary integrated wireless telecommunications system 14 is preferably based on object oriented software engineering technology, and the use of managed objects provided within the NMS-C 90 and the NMS-S 70 as illustrated in FIG. 3. Software objects are used to model and support the various functional, hardware, and interface components and sub-components associated with the integrated wireless telecommunications system 14. Such software may also model the functional procedures performed by physical components. Managed objects such as, for example, subscribers and trunk groups may be created, modified and deleted by an operator.

The NMS-S 70 includes a variety of software objects that may be logically grouped by function. Generally, the NMS-C 90 provides corresponding software objects that may provide a GUI interface to an operator. The corresponding software objects of the NMS-C 90 allow an operator to retrieve and display information from the corresponding objects of the NMS-S 70 and, in some cases, allow an operator to control these corresponding objects. The various software objects of the NMS-S 70 may be grouped into the functional areas of configuration management, fault management, performance management, accounting management, security management and system management. All of these functional areas correspond to a software object of the NMS-C 90 except for the security management element 80 which, preferably, will have very restricted access. The security management element 80 is preferably responsible for validating operator log-in information and restricting access to certain operations based on the operator's access class. This functionality may be provided by the operating system software of the NMS-S 70.

The functional areas of the NMS-S 70, as previously discussed in connection with FIG. 2, may be referred to as elements, while the corresponding software objects of the NMS-C 90 may be referred to as objects. The following elements have corresponding software objects of the NMS-C 90: the configuration management element 72, the fault management element 74, the performance management element 76, accounting management element 78 and the system management element 82. The configuration management element 72 includes an HLR/AuC object 128, a VLR object 130, a MAPP object 132, a signaling object 134 (such as an SS7 object), an MSC object 136, a resource manager object 138 and a BSC object 140. The corresponding software objects of the NMS-C 90 include an HLR/AuC object 108, a VLR object 110, a MAPP object 112, a signaling object 114 (such as an SS7 object), an MSC object 116, a resource manager object 118 and a BSC object 120. As mentioned previously, all of the objects of the NMS-C 90 generally provide GUI interfaces for an operator to monitor and configure the corresponding object in the NMS-S 70, such as maintaining subscriber data. Each of the objects of the NMS-S 70 corresponds with the associated application or object provided in the call processing application 54, the signaling application 56 and the resource manager application 58 as illustrated. The function of all of these applications and objects of the call processor 40 is provided above in connection with FIGS. 1 and 2.

With respect to the configuration management element 72, an operator can make changes to reflect the addition or removal of hardware components or modifications to their operational parameters, changes to reflect the addition or removal of subscribers and to subscriber service profiles, and modify translation tables of the MSC 48. Changes made by an operator are sent to the corresponding object of the NMS-S 70 which, in turn, updates a local data base, notifies all peer elements of the call processing application 54 of those changes, and reports the completion status of the change request to the operator.

The system management element 82, in the exemplary embodiment of FIG. 3, is provided as its own object that corresponds with the system management object 106 of the NMS-C 90 and the system controller application 94 of the call processor 40. This allows an operator to access and display information generated by the system controller application 94. The system management element 82 also supports the start-up and recovery functions of the entire system. Preferably, it is responsible for the sequential, automatic start-up of other objects of the NMS-S 70 by reading system start-up files and periodically polling such elements to verify their operational status and automatically restarting failed elements. The system management element 82 periodically requests that functional elements and objects of the integrated wireless telecommunications system 14 update their stored configuration files to support system recovery. This ensures the availability of start-up files that will allow the system processors to restart at a known configuration state following a shutdown or reset. The system management object 106 of the NMS-C 90 provides an operator with a list of elements or objects residing in the integrated wireless telecommunications system 14, and the status of such elements or objects. The operator is also provided with the ability to start, stop or query the status of individual elements or objects.

The accounting management element 78 and a corresponding accounting management object 104 provide billing records, in the form of call data records, that are reported from the accounting management element 78 to an EFR server object 124, which, in turn, stores the records on a database associated with the NMS-S 70. The performance management element 76 polls the call processing application 54 for function-specific performance measurements, and generates reports based on those measurements. The reports are sent and stored by the EFR server object 124. A corresponding performance management object 102 provides an interface for the operator for these functions of the performance management element 76.

The fault management element 74 concerns alarms and fault-related events. These are routed from the EFR server object 124 to the NMS-C 90 for display and to a log server object 126 for storage and later processing. The NMS-C 90 provides a filtering and reporting mechanism through a fault monitor object 100 that allows an operator to tailor alarm, event, and state change reporting to meet specific needs. The fault monitor object 100 may include a browser interface that allows one or more operators to access current alarm, event, alarm and state change information. The fault monitor object 100 interfaces with the fault management server object 122 of the NMS-S 70 and provides a consistent view of network alarm conditions. Real-time notifications are forwarded to the fault monitor object 100 from the EFR server object 124. An operator has the ability to filter these notifications (messages) based on their type and severity level.

The EFR server object 124 provides common services that support various elements and objects of the NMS-C 90. The EFR server object 124 receives real-time event notifications, such as alarms, test results and billing records, generated by the call processor 40, the resource assembly 60 and other elements of the NMS-S 70. The EFR server object 124 is operable to filter them, and then route them to desired destinations within the integrated wireless telecommunications system 14.

The log server object 126 is responsible for logging functions. As such, it receives various alarm, event, and state change notifications from the EFR server object 124 and stores the information to a database that may be accessed by the NMS-C 90.

Figure 4:
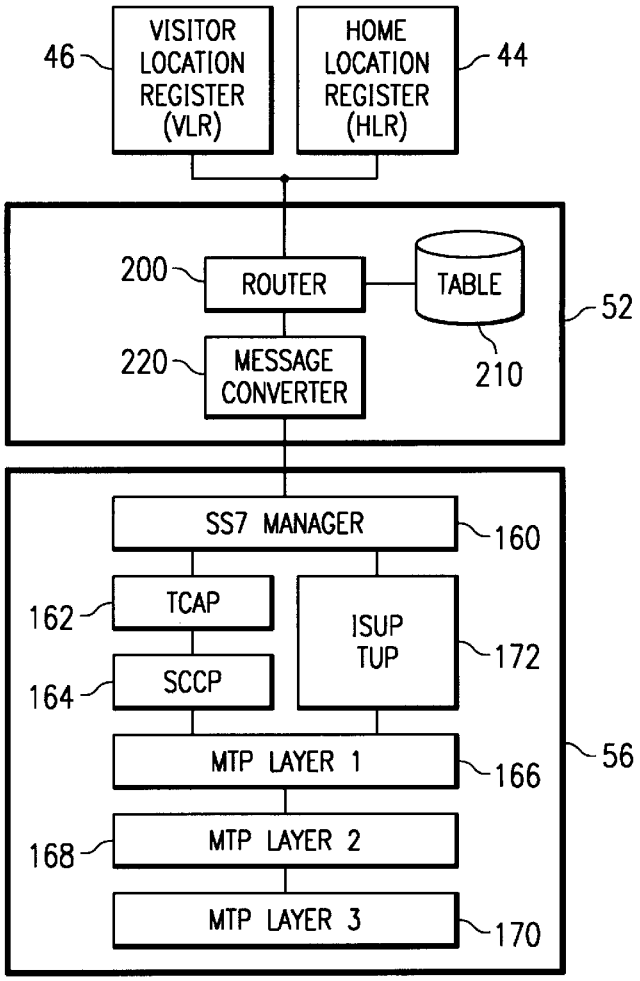
FIG. 4 is a block diagram illustrating an exemplary mobile application part provider that may exchange mobile application part messages with a visitor location register and a home location register and that may exchange transaction capability application part messages with a signaling application.

FIG. 4 is a block diagram illustrating the exemplary MAPP 52 that may exchange MAP messages with the VLR 46 and the HLR 44 and that may exchange TCAP messages with the signaling application 56. It should be noted that MAPP 52 is only an exemplary implementation of an application provider. The application provider of the present invention may exchange any of a variety of application part messages, such as MAP messages, with a first sub-system and a second sub-system of a common node, such as the VLR 46 and the HLR 44 of the integrated wireless telecommunications system 14. The application provider of the present invention may be implemented with virtually any application part that requires efficient communication between sub-systems of the same or common node and communications between sub-systems of different nodes that require a TCAP message interface with the signaling network. For example, the application provider may interface with virtually any application part such as the MAP, the Interim Standard 634 (IS-634), the Intelligent Network Application Part (INAP), the Intelligent Network Capability Set (INCS) application, the AIN application and any other application or service which uses the TCAP. Therefore, it should be understood that although the present invention is described in connection with the MAPP 52, it is in no way limited to such an application.

The MAPP 52 includes a router 200, a table 210 and a message converter 220. The router 200 may receive an application part message, such as a MAP message or primitive, from either the VLR 46 or the HLR 44. Assuming that the router 200 receives a MAP message from the VLR 46, the router 200 analyzes the MAP message to determine if the MAP message is destined for another sub-system of the same node as the VLR 46. For example, the HLR 44 is provided at the same node defined by the integrated wireless telecommunications system 14 as illustrated previously in connection with FIG. 2. The router 200 compares the destination address of the MAP message with destination addresses stored in the table 210. These addresses may be provided in virtually any format. Preferably, the addresses will be provided in a convenient format such as a format related to the IMSI of the subscribers served by the integrated wireless telecommunications system 14 or as a global translation.

If the router 200 finds a match with the table 210, the MAP message is routed back to the corresponding sub-system referenced in the destination address. In this case, the HLR 44 may be the destination sub-system and thus, router 200 would route the MAP message to the HLR 44. If the router 200 does not find a match with the information provided by the table 210, the MAP message is provided to the message converter 220. This, for example, could occur when the VLR 46 seeks information from the home HLR of a roaming subscriber.

The message converter 220 provides an interface with the signaling application 56. Generally, the message converter inserts, attaches or appends a TCAP header to the MAP message to generate a TCAP message. The message converter 220 may also be described as receiving a MAP primitive and generating a TCAP primitive in response. The MAPP 52 may manage multiple MAP sessions or dialogues. This may be accomplished in software using state machines to keep track of the current status of a particular MAP session or dialogue between two sub-systems. The present invention provides the significant advantage of minimizing the number of state machines required and thus efficiently allocates limited resources. The GSM specification of GSM 09.02 Mobile Application Part Specification, which is incorporated herein be reference, outlines the various interfaces between GSM entities or sub-systems that use the MAP.

However, the GSM 09.02 Mobile Application Part Specification does not teach, suggest or describe the present invention.

Assuming that the router 200 does not find a match with the table 210 and the message converter 220 generates a TCAP message in response, the signaling application 56 receives the TCAP message. The signaling application 56 may include an SS7 manager 160 along with various standard layers or protocols of the SS7 signaling protocol. It should be noted that the present invention is not dependent upon the SS7 manager 160, as all of the functionality and advantages of the present invention are provided with or without the SS7 manager 160. The various layers and protocols include the TCAP 162, the SCCP 164, the MTP Layer 3 (MTP 3), the MTP Layer 2 (MTP 2), and the MTP Layer 1 (MTP 1) which together provide additional routing and management functions for the transfer of messages and for database queries used for non call-setup or transaction functions such as the exchange of MAP messages. The signaling application 56 also includes an ISUP/TUP 172, that, in combination with the MTP 3, the MTP 2, and the MTP 1 provides call setup functions that include coordinating and taking down trunk calls and other call-setup functions.

The SS7 manager 160 provides for management and cooperation with respect to the other elements of the signaling application 56 and other elements of the call processor 40, including the MAPP 52, the resource manager application 58 and the MSC 48. The SS7 manager 160 receives the TCAP message from the message converter 220 of the MAPP 52 and provides it to the TCAP 162. The TCAP 162 generates an SCCP message by inserting or adding an SCCP header to the TCAP message. The SCCP 164 then receives the SCCP message and performs a Global Title Translation (GTT). The GTT may yield any of a variety things such as the destination address or outgoing route of the SCCP message. In such a case, the SCCP 164 may generate an MTP message by inserting or adding an MTP header to the SCCP message. This MTP message is then provided to the MTP layers for communication to the destination address.

As mentioned previously, the signaling application 56 may be implemented in any of a variety of ways, such as by providing the upper layers, such as the SS7 manager 160, the TCAP 162, the SCCP 164, the ISUP/TUP 172 and the MTP 3 as software objects of the call processor 40, while the lower two MTP layers may be provided as part of a signaling line card that interfaces with the call processor 40.

Thus, the MAPP 52 provides the significant advantages of the present invention by eliminating the need to perform various signaling or SS7 transactions when an application part message, such as a MAP message, is exchanged between sub-systems of the same node. This type of message exchange is not uncommon and occurs frequently in many telecommunications applications.

Figure 5:
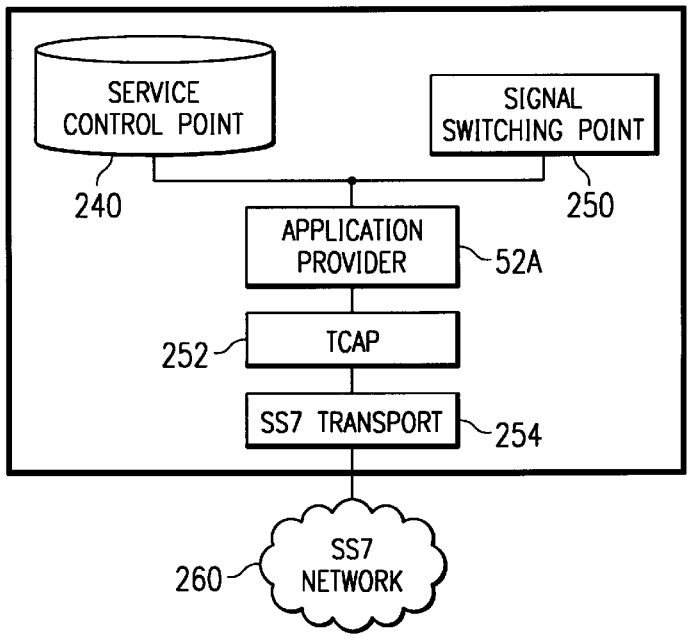
FIG. 5 is a block diagram illustrating an application provider for communication between a service control point and a service switching point of a common node in a telecommunications network.

FIG. 5 is a block diagram illustrating an exemplary application provider 52A for communication between a Service Control Point (SCP) 240 and a Service Switching Point (SSP) 250 of a common node in a telecommunications network. The SCP 240 may also be referred to as Signal Control Point in addition to a Service Control Point. Similarly, the SSP 250 may also be referred to as Signal Switching Point in addition to a Service Switching Point. The SCP 240 and the SSP 250 may be co-located or logically configured to operate from the same node (or a common node) of a telecommunications network. As such, the SCP 240 and the SSP 250 may be thought of as sub-systems of a common node, similar to the VLR 46 and the HLR 44 as described previously in connection with FIG. 4.

A TCAP 252 and an SS7 transport 254 are provided between the application provider 52A and a SS7 Network 260. The TCAP 252 and the SS7 transport 254 serve as the SS7 layers that are used to communicate an application part message to the SS7 Network 260. The SS7 transport 254 will generally include an SCCP layer and the three MTP layers.

The application provider 52A performs the functions of the present invention by receiving an application part message from either the SCP 240 or the SSP 250 that is destined for the other. In such a case, there is no need to convert or provide the application part message as a TCAP message to the TCAP 252 because the communication is between sub-systems of a common node. Instead, the application provider 52A routes the application part message to the destination sub-system.

In the case where an application part message from either the SCP 240 or the SSP 250 is destined for a sub-system outside of the common node, there is a need to convert or provide the application part message as a TCAP message to the TCAP 252. This is performed by the application provider 52A, just as with the MAPP 52 discussed previously. The TCAP 252 converts the TCAP message to an SCCP message and provides the SCCP message to the SS7 transport 254. The message is ultimately provided to the SS7 Network 260. Thus, FIG. 5 illustrates another application of the present invention.

It should be understood that the application of FIG. 5 in which the application part message is generated may be virtually any signaling application or service such as an AIN application or service. In other embodiments of FIG. 5, the SCP 240 could be an Intelligent Peripheral (IP) operable to provide any of a variety of AIN services.

Figure 6:
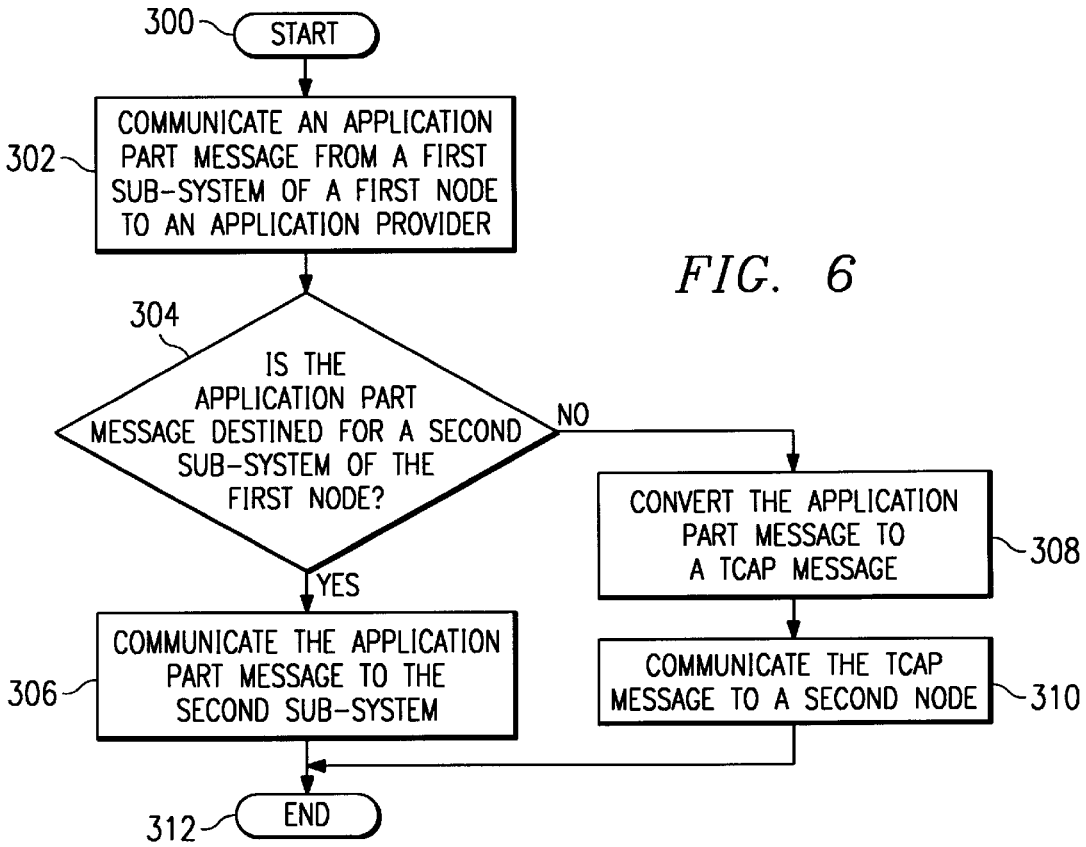
FIG. 6 is a flowchart illustrating an exemplary method for communication between a first sub-system and a second sub-system of a first node according to the teachings of the present invention.

FIG. 6 is a flowchart illustrating an exemplary method for communication between a first sub-system and a second sub-system of a first node according to the teachings of the present invention. The method begins at step 300 and proceeds to step 302 where an application part message is communicated from a first sub-system of a first node to an application provider. For example, the application part message may be a MAP message received from a VLR of a wireless telecommunications system. In other embodiments, the application part message may be provided from, for example, an SCP of a common node that contains an SCP and an SSP. The method proceeds next to decision step 304.

Decision step 304 involves determining whether the application part message is destined for a second sub-system of the first node. This may be accomplished in any number of ways. For example, a global title provided as part of the application part message may be compared to stored global titles to determine whether the application part message is destined for a sub-system. If the application part message is destined for the first node, the method proceeds to step 306, otherwise, the method proceeds to step 308.

At step 306, the application part message is communicated to the destination sub-system of the first node. For example, assuming that the application part message is destined for the second sub-system of the first node, the application part message is then communicated to the second sub-system of the first node. The method then ends at step 312.

Assuming that the application part message is not destined for a sub-system of the first node as determined at decision step 304, the method proceeds to step 308 where the application part message is converted to a TCAP message. This may be accomplished in any number of ways known to one of ordinary skill in the art. For example, the application part message may have a TCAP header inserted or appended to generate the TCAP message. At step 310, a TCAP message may then be communicated to a second node. This will normally involve using SS7 signaling layers or protocols such that the TCAP messages first converted to an SCCP message so that a global title translation may be provided. The message may then be provided as an MTP message and communicated to a second using an SS7 signaling network.

The method of the present invention may be utilized at virtually any node of a telecommunications network to provide the many advantages discussed above. This includes both wireless and fixed telecommunications systems. For example, the node may be a wireless telecommunications system or switch, a node that includes an SCP and an SSP, an IP, an AIN node and the like. Similarly, the various sub-systems of the node may include virtually any telecommunications element such as a VLR, an HLR, an MSC, an SCP, an SSP, an IP and the like.

Thus, it is apparent that there has been provided, in accordance with the present invention, an application provider and method for communication between a first sub-system and a second sub-system of a common node that satisfies the advantages set forth above. Although the present invention has been described in detail, it should be understood that various changes, substitutions and alterations can be made herein without departing from the scope of the present invention. For example, although the application part and application provider of the present invention was primarily illustrated in connection with a MAP and a MAP Provider, the present invention is in no way limited to such an implementation and, in fact, may be implemented at virtually any node of the signaling network so that local sub-systems may efficiently communicate with one another. As another example, the direct connections or communications illustrated herein could be altered by one skilled in the art such that two components or sub-systems are merely coupled to one another through an intermediate component or components without being directly connected while still achieving the desired results demonstrated by the present invention. Furthermore, although the present invention has been primarily illustrated and described with respect to a GSM wireless telecommunications network, it should be understood that the present invention is no way limited to a GSM wireless telecommunications network. In fact, the present invention could be used with virtually any telecommunications network, whether currently in existence or developed in the future, operating at virtually any frequency and using virtually any technology. Other examples of changes, substitutions, and alterations are readily ascertainable by one skilled in the art and could be made without departing from the spirit and scope of the present invention as defined by the following claims.

What is claimed is:

1. An application provider comprising:

a table operable to store information corresponding to a sub-system of a first node;

a router operable to analyze an application part message originating from the first node and to compare the information stored in the table to the destination of the application part message to determine if the application part message is destined for the sub-system of the first node, the router operable to communicate the application part message to the first node if the application part message is destined for the sub-system of the first node; and a message converter operable to convert the application part message to a transaction capability application part message if the router determines that the application part message is not destined for the sub-system of the first node.

2. The application provider of claim 1, wherein the application part message is a mobile application part message and the first node is a wireless telecommunications system.

3. The application provider of claim 2, wherein the sub-system is a visitor location register.

4. The application provider of claim 2, wherein the sub-system is a home location register.

5. The application provider of claim 2, wherein the sub-system is a mobile switching center.

6. The application provider of claim 2, wherein the information stored in the table relates to International Mobile Subscriber Identity Numbers served by the wireless telecommunications system.

7. The application provider of claim 1, wherein the application part message is generated from a Global System for Mobile Communications Mobile Application Part signaling protocol.

8. The application provider of claim 1, wherein the application part message is generated by an Interim Standard 41 signaling protocol.

9. The application provider of claim 1, wherein the application part message is generated by an Advanced Intelligent Network service.

10. The application provider of claim 1, wherein the application part message is generated by an Interim Standard 634.

11. The application provider of claim 1, wherein the application part message is generated by an Intelligent Network Application Part.

12. The application provider of claim 1, wherein the application part message is generated by an Intelligent Network Capability Set application.

13. The application provider of claim 1, wherein the sub-system is a Service Switching Point.

14. The application provider of claim 1, wherein the sub-system is a Service Control Point.

15. The application provider of claim 1, wherein the application part message originates from a second sub-system of the first node and is destined for the sub-system of the first node.

16. The application provider of claim 1, wherein the application part message is a mobile application part message and the first node is an integrated wireless telcommunications system.

17. The application provider of claim 16, wherein the mobile application part message is generated by a mobile application part that is implemented in a call processing application as one or more software objects.

18. A call processing application of a wireless telecommunications system that includes a plurality of software objects, the call processing application comprising:

a mobile switching center implemented in one or more of the plurality of software objects and operable to control the switching of calls;

a base station controller implemented in one or more of the plurality of software objects and operable to manage the radio resources for one or more base station transceivers;

a home location register implemented in one or more of the plurality of software objects and operable store subscriber information;

a visitor location register implemented in one or more of the plurality of software objects and operable to store information on active subscriber units; and an application provider operable to analyze an application part message received from a first sub-system of the wireless telecommunications system and to route the application part message back to a sub-system of the wireless telcommunications system if the application part message is destined for a second sub-system of the wireless telcommunications system, the application provider operable to convert the application part message to a transaction capability application part message and to route the transaction capability application part message to a transaction capability application part if the application part message is not destined for a second sub-system of the wireless telcommunications system.

19. The call processing application of claim 18, wherein the first sub-system is the visitor location register and the second sub-system is a home location register.

20. The call processing application of claim 19, wherein the application provider is a mobile application part provider and the application part message is a mobile application part message.

21. A method for communication between a first sub-system and a second sub-system of a first node comprising the steps of:

communicating an application part message from the first sub-system to an application provider;

determining if the application part message is destined for the second sub-system; and communicating the application part message to the second sub-system if the application part message is destined for the second sub-system.

22. The method of claim 21, further comprising the step of:

converting the application part message to a transaction capabilities application part message if the application part message is not destined for the first node.

23. The method of claim 22, further comprising the step of:

communicating the transaction capabilities application part message to a second node.

24. The method of claim 23, wherein the application part message is a Mobile Application Part message that is destined for a second node and the Mobile Application Part message includes a global title.

25. The method of claim 21, wherein the application part message is a Mobile Application Part message.

26. The method of claim 21, wherein the first sub-system is a visitor location register.

27. The method of claim 21, wherein the first sub-system is a home location register.

28. The method of claim 21, wherein the first sub-system is a mobile switching center.

29. The method of claim 21, wherein the application provider is implemented in one or more software objects.

30. The method of claim 21, wherein the first node is a wireless telecommunications system.

31. The method of claim 21, wherein the first node is an integrated wireless telecommunications system.

32. The method of claim 21, wherein the first node provides advanced intelligent network services and the first sub-system is a Signal Switching Point and the second sub-system is a Service Control Point.

33. The method of claim 21, wherein the application part message is a Mobile Application Part message that is a Mobile Application Part primitive.

34. The method of claim 23, wherein the transaction capabilities application part message is a transaction capabilities application part primitive.

* * * * *